June 14, 1960 R. F. COTELLESSA ET AL 2,941,162

DEVICE FOR AUTOMATICALLY MEASURING AMPLITUDE MODULATION INDEX

Filed May 7, 1958

DC BIAS VOLTAGE, Eg, PROPORTIONAL
TO CARRIER (VOLTS)

*INVENTORS,*
ROBERT F. COTELLESSA
*BY* LESTER J. SAPORTA
ELIAS T. SCHUTZMAN

Harry M. Saragovitz
*ATTORNEY.*

United States Patent Office 2,941,162

Patented June 14, 1960

2,941,162

DEVICE FOR AUTOMATICALLY MEASURING AMPLITUDE MODULATION INDEX

Robert F. Cotellessa, Glen Rock, N.J., and Lester J. Saporta, Bronx, and Elias T. Schutzman, Flushing, N.Y., assignors to the United States of America as represented by the Secretary of the Army Filed May 7, 1958, Ser. No. 735,086

6 Claims. (Cl. 332—39)

The present invention relates to a device for automatically measuring the amplitude modulation index of an amplitude modulated signal, and more particularly to such a device in which the output is not altered by a change in the carrier level if the modulation index remains constant.

The term modulation index as used herein is synonymous with the terms modulation factor and degree or percentage modulation and can be defined as:

$$m_i = \frac{Em}{Ec} \qquad (1)$$

where $m_i$ is modulation index, $Em$ is peak or R.M.S. value of modulation voltage, and $E_c$ is peak or R.M.S. value of carrier voltage. An object of the present invention is to provide a novel, simple, and efficient electrical circuit for indicating the modulation index of an amplitude modulated signal.

Another object of the present invention is to provide an electrical device which indicates the same output regardless of the carrier level as long as the modulation index is constant.

To satisfy this last object it is necessary that the modulation index indicating device have an output or gain versus carrier-level characteristic curve which is substantially a hyperbola. It is accordingly a further object of the present invention to provide a modulation index indicating device that satisfies this condition.

The present invention is put into practical application by the utilization of two variable-mu pentode tubes serving as non-linear devices, the first having in addition to a fixed bias a variable bias arrangement which varies the gain thereof and the second having a fixed bias and therefore a substantially constant gain. When a direct current (D.-C.) voltage proportional to the carrier level of an amplitude modulated signal is applied as the variable bias to the control grid of the first tube and the modulation on the carrier is applied as an alternating current (A.-C.) signal to the control grids of each of the tubes, the sum of the outputs therefrom will be proportional to the modulation index of the amplitude modulated signal and will therefore be indicative of the modulation index.

Figure 1:
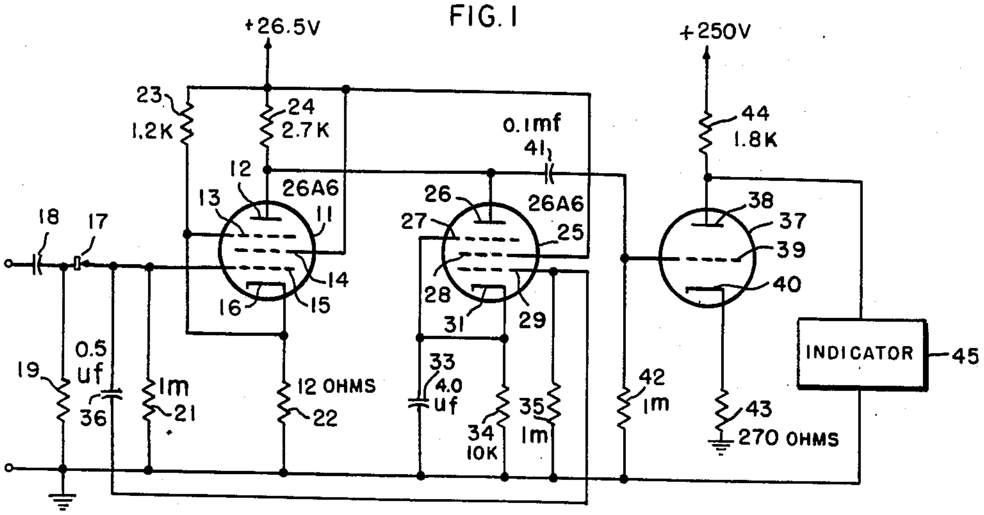
Figure 2:
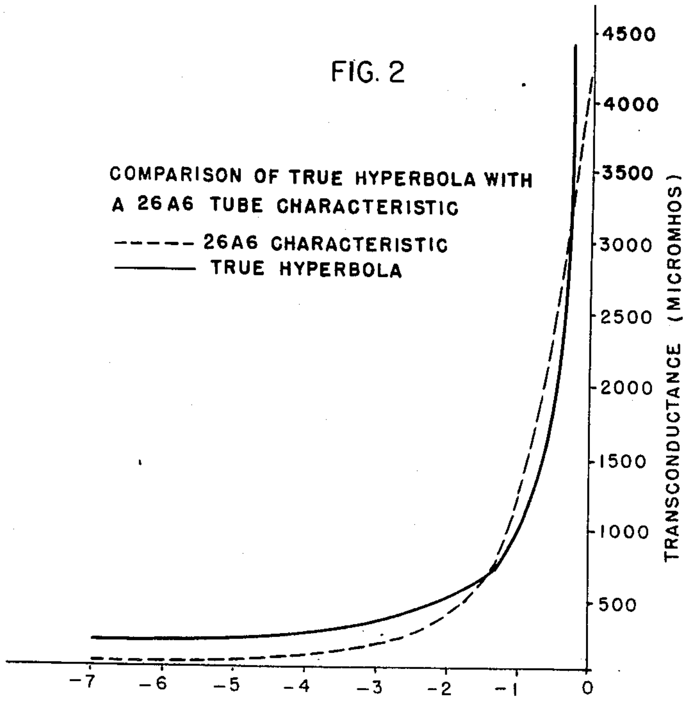

The exact nature of this invention, as well as other objects and advantages thereof, will be readily apparent from consideration of the following specification relating to the annexed drawings in which:

Figure 1 depicts a schematic diagram of the preferred embodiment of the invention; and Figure 2 is a graph comparing a true hyperbola with a curve of the grid $e_g$ voltage versus transconductance $g_m$ characteristic of a 26A6 variable mu pentode tube.

Referring now to the drawings there is shown in Figure 1 a first 26A6 variable-mu pentode tube 11 (serving as a first non-linear device) having a plate 12, suppressor grid 13, screen grid 14, control grid 15 and cathode 16. A rectifier 17 is connected between control grid 15 and capacitor 18 in the input circuit to provide a direct-current bias for grid 15 which is proportional to the incoming carrier signal. Between the junction of rectifier 17 and capacitor 18 and ground is connected resistor 19. Resistor 21 and resistor 22 are connected between control grid 15 and ground and cathode 16 and ground, respectively; and resistor 23 and resistor 24 each have one end connected in common with a +26.5 volt supply and the other end connected to suppressor grid 14 and plate 12, respectively. Resistors 22 and 23 form a fixed bias network for this tube. Cathode 16 is connected in common with suppressor grid 13 and screen grid 14 is connected to the +26.5 volt supply.

A second 26A6 variable-mu pentode tube 25 (serving as the second non-linear device) having plate 26, suppressor grid 27, screen grid 28, control grid 29, and cathode 31, has its plate 26 connected in common with plate 12 of first pentode 11. Suppressor grid 27 is connected in common with cathode 31 to one end of a parallel combination of capacitor 33 and resistor 34, the other end of the combination being connected to ground. Screen grid 28 is connected to the +26.5 volt supply, and control grid 29 is connected through resistor 35 to ground. Capacitor 36 is connected between control grid 15 and control grid 29 to feed the alternating current modulation to control grid 29 while blocking the direct current produced by rectifier 17 in accordance with the carrier level.

An amplifier tube 37 having a plate 38, grid 39, and cathode 40 has its control grid 39 coupled to plates 12 and 26 by capacitor 41. Grid resistor 42 and cathode resistor 43 are connected between grid 39 and ground and cathode 40 and ground, respectively; and plate resistor 44 is connected between plate 38 and a +250 volt supply. An alternating current indicator 45 is connected between plate 38 and ground. Indicator 45 may be a meter or an oscilloscope, for example. If a meter is used, a capacitor might be placed in series to block the D.-C. plate current.

The present invention utilizes the inherent grid voltage-plate current characteristic of a variable-mu pentode tube wherein the plate current $i_p$ is a logarithmic function of the applied grid voltage $e_g$ and is expressed as:

$$i_p = K \log e_g \qquad (2)$$

where K is a proportionality constant. The dynamic gain or transconductance $g_m$ of the pentode is determined by differentiating Equation 2, $$g_m = \frac{dip}{de_g} = \frac{K}{e_g} \qquad (3)$$

This expression shows that in an ideal situation the pentode will have an inverse, or hyperbolic, characteristic. As a practical matter, however, available pentodes have characteristic $g_m$ versus $e_g$ curves which merely approximate hyperbolas when the pentodes operate over a wide range of bias voltages.

By comparing the curves in Figure 2, it can be seen that by shifting the curve of the 26A6 pentode (the particular variable-mu pentode selected as most suitable for the present invention) upward and to the right a closer approximation of the true hyperbola curve can be obtained. The closest alignment between the two curves results when the origin of the 26A6 characteristic is shifted to the right by 0.2 volt and upward by 220 micromhos. The shifting to the right is accomplished by the use of resistors 22 and 23 which apply a fixed small negative bias to pentode 11. To obtain the desired upward movement, a fixed transconductance is added to the variable transconductance of pentode 11 by the use of second pentode 25 which has a fixed direct current bias determined by the parallel combination of resistor 34 and capacitor 33. Capacitor 36 prevents D.-C. in the grid circuit of pentode 11 from affecting the bias of pentode 25. With plate 12 tied to plate 26 the constant $g_m$ of pentode 25 is thereby added to the variable $g_m$ of pentode 11.

The mid-band gain G of such pentodes is closely given by the relationship:

$$G=g_m R_L \qquad (4)$$

where $R_L$ is the plate load resistance. Since the $g_m$ versus $e_g$ curve is substantially a hyperbola, i.e., the $g_m$ of the tube is inversely proportional to the grid voltage (shown in Equation 3 above), the gain G is also inversely proportional to the grid voltage $E_g$:

$$G=\frac{K}{E_g} \qquad (5)$$

Since the output voltage $E_o$ of a pentode tube given in terms of its gain and the alternating current input voltage $E_i$ is:

$$E_o=GE_i \qquad (6)$$

the substitution therein of the relationship of G as shown in Equation 5 gives the following result:

$$E_o=K\frac{E_i}{E_g} \qquad (7)$$

Where the grid voltage $E_g$ comprises an alternating current or input voltage $E_i$ and a direct current or bias voltage $E_B$, i.e., $$E_g=E_i+E_B \qquad (8)$$

and where:

$$E_B \gg E_i \qquad (9)$$

then $$E_o=\frac{KE_i}{E_B} \qquad (10)$$

Thus the output voltage $E_o$ is substantially proportional to the ratio of the alternating current input voltage $E_i$ to the bias voltage $E_B$.

By deriving a direct current grid bias for pentode 11 from the peak radio-frequency carrier level and having it proportional thereto, and by having the signal input to control grid 15 of pentode 11 equal to the R.M.S. value of the modulation on the carrier the following relationship exists:

$$\frac{E_i}{E_B}=\frac{E_m(\text{R.M.S.})}{E_c(\text{peak})} \qquad (11)$$

Since from Equation 1

$$\frac{E_m(\text{peak})}{E_c(\text{peak})}=m_i$$

and since $$\frac{\text{R.M.S. value}}{0.707}=\text{peak value}$$

then $$\frac{E_i}{E_B}=0.707\,m_i \qquad (12)$$

Therefore substituting Equation 12 in Equation10:

$$E_o=0.707\,m_i K \qquad (13)$$

Thus the output voltage $E_o$ is proportional to the modulation index $m_i$.

The invention, as shown in Figure 1, operates as follows in determining the modulation index $m_i$ of an amplitude modulated signal. The modulated signal is applied through capacitor 18 to the input of rectifier 17. Rectifier 17 behaves such that its output is formed of two components, the first being a direct current voltage proportional to the carrier level of the modulated signal and the second being the modulation on the carrier. The direct current voltage proportional to the carrier behaves as a variable direct current grid bias on pentode 11 and is applied with the modulation on the carrier to control grid 15 of pentode 11, the modulation voltage also being applied simultaneously to control grid 29 of pentode 25 through capacitor 36. The direct current voltage proportional to the carrier level is blocked by capacitor 36 and thus is prevented from passing to control grid 29.

The alternating current output from pentodes 11 and 25 are combined and are passed through capacitor 41. This combined output, which is proportional to the modulation index, is applied to grid 39 of amplifier 37. The amplified output from amplifier 37 is applied to indicator 45 which is a voltage indicating device or the like. More particularly, indicator 45 can be calibrated to read modulation index directly.

In a practical application, using the circuit of Figure 1 and the circuit values shown therein, a range of radio frequency carrier levels of 0.7 to 7 volts, a range of 10 to 1, indicated the modulation index correctly to within 10% for modulation indices below 0.1. Should it be desirable to do so, a simple circuit change results in a scale compression which permits accurate measurements of modulation indices as high as 1.0.

It should be understood, of course, that the foregoing disclosure relates merely to a preferred embodiment of the invention. Numerous modifications or alterations may be made therein without departing from the spirit and scope of the invention as set forth in the appended claims.

What is claimed is:

1. A device for measuring the amplitude modulation index of a modulated signal comprising first and second variable mu pentode electron tubes, each having a logarithmic plate current-control grid voltage transfer characteristic, said first and second tubes each having a fixed D.-C. bias voltage applied thereto, said first tube having a first control grid and a first plate and said second tube having a second control grid and a second plate, coupling means connected to said first grid for applying thereto a D.-C. voltage proportional to the carrier level of said modulated signal and the A.-C. modulation components of said modulated signal after detection, means for applying to said second control grid said A.-C. modulation components coupling means connected to said first and second plates, and an indicating means connected to said coupling means to receive the output therefrom, said indicating means giving a reading proportional to said amplitude modulation index.

2. A device for measuring the amplitude modulation index of a modulated signal comprising a first variable mu pentode electron tube having a cathode, a control grid, and a plate; a resistor connected between said cathode of said first tube and ground for setting a fixed bias on said first tube, said grid of said first tube having applied thereto a D.-C. voltage proportional to the carrier level of said modulated signal and A.-C. modulation components of said modulated signal after detection thereof, said D.-C. voltage acting as an additional bias for said first tube; a second variable mu pentode electron tube having a cathode, a control grid and a plate; a fixed biasing means connected between said cathode of said second tube and ground, said plate of said first tube being connected to said plate of said second tube; a capacitor connected between said control grid of said first tube and said grid of said second tube for blocking D.-C. voltages and passing said A.-C. modulation components to the grid of said second tube, said second tube behaving as a fixed transconductance added to that of said first tube; a coupling means; and an indicating means, said coupling means applying the outputs from said first and second tubes to said indicating means, said indicating means thereby giving a reading proportional to said amplitude modulation index.

3. The device of claim 2 wherein said fixed biasing means is a parallel combination of resistor and capacitor.

4. The device of claim 3 wherein said coupling means comprises an electron discharge device having a cathode, a control grid and a plate; and a capacitor connected between said plate of said first tube and said control grid of said electron discharge device for passing A.-C. voltages therebetween, said indicating means being connected between said plate and said cathode of said electron discharge device.

5. An apparatus for measuring the amplitude modulation index of a modulated signal comprising a first electron discharge device having a characteristic curve of transconductance versus control grid voltage of substantially a hyperbola, said first device having at least a cathode, a control grid and a plate, said control grid having its bias determined by a D.-C. voltage proportional to the carrier level of said amplitude modulated signal, said control grid having applied thereto A.-C. modulation components of said modulated signal after detection thereof; a cathode resistor connected between said cathode of said first device and ground for setting a fixed bias on said device and thereby modifying said characteristic curve of said device so that it approaches a true hyperbola curve; a second electron discharge device having at least a cathode, a control grid and a plate, said second device adding a constant transconductance to said first device thereby modifying said characteristic curve still further so that it more nearly approaches a true hyperbola; a parallel combination of resistor and capacitor connected between said cathode of said second device and ground, said second device having a constant bias voltage determined by said parallel combination of resistor and capacitor, said A.-C. modulation components being coupled to said control grid of said second device as well as to said control grid of said first device; a coupling means, said first and second devices having their plates connected in common and having output voltages therefrom applied to said coupling means; and an indicating means connected to the output of said coupling means, said output from said coupling means being proportional to said modulation index, said indicating means being calibrated to allow said modulation index to be read directly.

6. The apparatus of claim 5 further comprising a first capacitor connected between said control grid of said first device and said control grid of said second device for coupling of said A.-C. modulated components therebetween; and wherein said coupling means comprises an amplifying means and a second capacitor, said amplifying means having at least a grid and a plate, said second capacitor connected between said plate of said first device and said grid of said amplifying means, said indicating means connected to said plate of said amplifying means.

References Cited in the file of this patent

UNITED STATES PATENTS 2,119,194 Babler ---------------- May 31, 1938

UNITED STATES PATENT OFFICE

CERTIFICATE OF CORRECTION

Patent No. 2,941,162 June 14, 1960

Robert F. Cotellessa et al.

It is hereby certified that error appears in the printed specification of the above numbered patent requiring correction and that the said Letters Patent should read as corrected below.

Column 4, line 43, after "components" insert a comma.

Signed and sealed this 15th day of November 1960.

(SEAL)
Attest:

KARL H. AXLINE
Attesting Officer

ROBERT C. WATSON
Commissioner of Patents